Nov. 17, 1931.  D. M. SMITH  1,832,842

PISTON RING

Filed March 24, 1931

INVENTOR:
DALLAS M. SMITH.
BY J Henry Kinealy
ATTORNEY.

Patented Nov. 17, 1931

1,832,842

UNITED STATES PATENT OFFICE

DALLAS M. SMITH, OF WEBSTER GROVES, MISSOURI, ASSIGNOR TO McQUAY-NORRIS MANUFACTURING COMPANY, OF ST. LOUIS, MISSOURI, A CORPORATION OF DELAWARE

PISTON RING

Application filed March 24, 1931. Serial No. 524,890.

My invention relates to piston rings and more particularly to piston rings for use in internal combustion engines of the modern high speed type.

In my co-pending application, Serial No. 494,572, filed November 10, 1930, I have described certain conditions under which it is advantageous to use piston rings which develop a high unit radial pressure between the cylinder contacting face of the ring and the wall of the cylinder in which the ring is used and the piston ring which is the subject of this application is of this high radial pressure type. However, if a ring of this type is made as described in my co-pending application mentioned above and the passages leading radially therethrough are positioned as defined in that application sometimes in rings of small sizes too much metal is taken from a cylinder contacting portion of the ring.

Therefore, the object of this invention is to provide a piston ring having a reduced cylinder contacting area so that the unit radial pressure developed against the cylinder wall will be greatly increased, but in which the radially extending passages do not lead through the ring to the cylinder contacting face.

Figure 1:
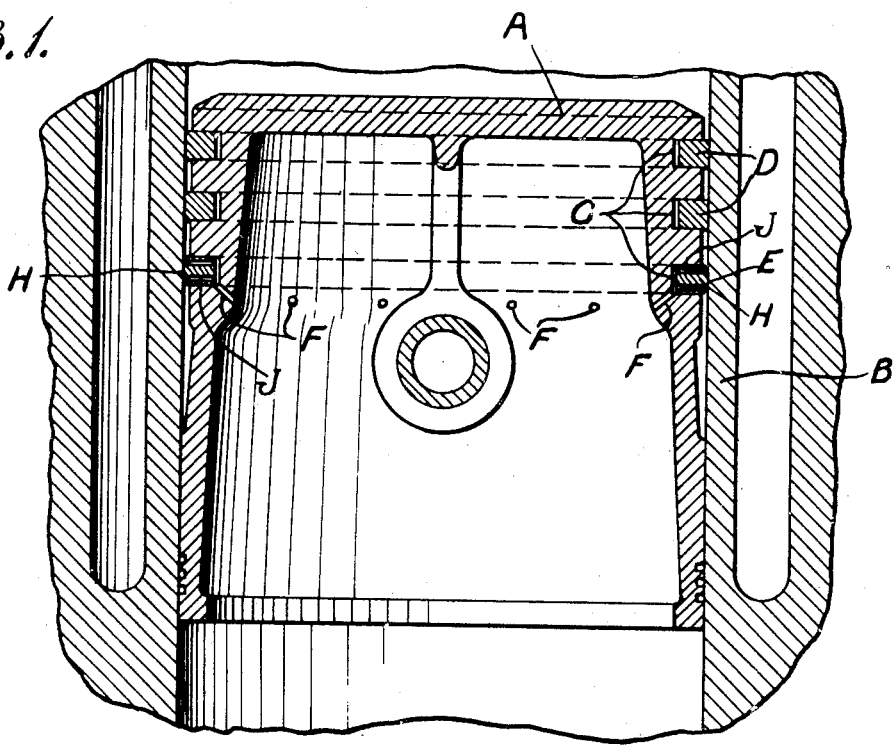
Figure 2:
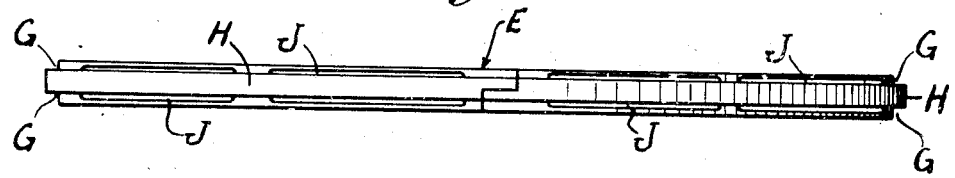
Figures 3, 4:
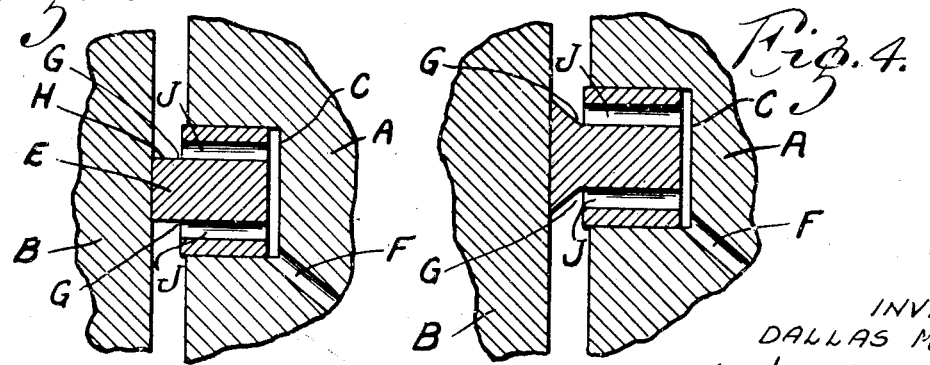

Several embodiments of my invention are shown in the accompanying drawings wherein similar characters are used to designate similar parts: Fig. 1 is a cross section through a piston and cylinder with piston rings inserted in the ring grooves; Fig. 2 is a side view of the piston ring made according to my invention; Fig. 3 is a section of the ring in place on a piston and Fig. 4 is a view similar to Fig. 3 of a slightly modified form of ring.

Referring to the figures the piston A is adapted to move in the cylinder B and has formed in the head thereof three ring grooves C. As shown in the drawings in the two uppermost grooves are positioned ordinary pressure rings D and in the lowermost groove is positioned a ring E embodying my invention. The piston A may be of any type and may be provided with a plurality of ports F leading inwardly and downwardly from the ring groove C in the usual manner, as shown in Fig. 1.

The piston ring E in the form shown in Figs. 1, 2 and 3 of the drawings comprises a resilient band which is split as at F and is, therefore, inherently elastic. The ring has the corners thereof reduced as by the formation of a pair of annular grooves G cut in the outer corners and arranged substantially parallel to one another so as to form a circumscribing cylinder contacting rib H midway the side faces of the ring and preferably substantially centrally axially thereof, as shown. Leading from each of the grooves G is a circumferentially arranged series of passages which, in this embodiment of my invention, are in the form of slots J. I prefer that the inner wall of each of the slots J is substantially in the same plane as the side wall of the rib at the base thereof.

In the embodiment of my invention shown in Figs. 1, 2 and 3 the side walls of the rib H are substantially parallel, but in the embodiment of Fig. 4 the side walls flare outwardly so that the outer face of the rib H is broader and the cylinder contacting portion of the ring will be greater than that of the other embodiment.

It readily will be seen that rings embodying my present invention have a high unit radial pressure with a constant loading of the ring and at the same time may be made in extremely small sizes with narrow cylinder contacting surfaces and yet may contain relief passages. Likewise, the ring has two circumferentially arranged series of slots with one series separated from the other by a cylinder contacting rib and, therefore, the series at the lower side of the ring will allow oil scraped from the cylinder wall to pass therethrough and the series at the upper side of the ring will allow any gases finding their way downwardly from the combustion chamber to pass therethrough and the oil pressure and the gas pressure will be somewhat equalized and balanced in the space behind the ring in the ring groove. By varying the sizes of the slots of passages in the two series a proper balance between the oil pressure and the gas pressure under varying conditions may be obtained. In some applications and uses of this invention the ports F leading rearwardly through the piston may be dispensed with because of this balanced pressure.

I do not intend to limit my invention to the details of construction shown in the drawings nor do I intend to limit the use of a ring embodying my invention to any certain place on the piston because under different conditions and in different embodiment the size, shape and arrangement of the various elements of the ring and piston of the ring on the piston may be varied within wide limits without departing from the appended claims.

What I claim as new and desire to secure by Letters Patent, is:—

1. A piston ring having a groove formed at each of the outer corners thereof and also having passages extending from each of said grooves rearwardly through said ring.

2. A piston ring comprising a resilient split band having a groove formed at each of the outer corners thereof and also having a circumferentially arranged series of passages extending from each of said grooves rearwardly through said ring.

3. A piston ring comprising a resilient split band having the outer corners thereof reduced to form a cylinder contacting face of less width than the body of said ring, and said ring having passages extending rearwardly therethrough from each of said reduced portions.

4. A piston ring comprising a resilient split band having the outer corners thereof reduced to form a cylinder contacting face of less width than the body of said ring, and said ring having a circumferentially arranged series of slots extending therethrough from each of said reduced portions.

5. A piston ring having a cylinder contacting rib arranged between the end faces thereof and said ring having a circumferentially arranged series of passages extending rearwardly therethrough from each side of said rib.

6. A piston ring comprising a resilient split band having a pair of substantially parallel groves formed in the outer face thereof with a resultant cylinder contacting rib arranged between said grooves and between the side faces of said ring, and said ring having a circumferentially arranged series of passages extending rearwardly therethrough from each of said grooves.

7. A piston ring comprising a resilient split band having the outer corners thereof reduced to form a cylinder contacting face of less width than the body of said ring and positioned substantially centrally axially thereof, said ring having a series of circumferentially arranged slots extending rearwardly therethrough from each of said reduced portions, and said slots being arranged and positioned with the inner wall thereof substantially in the plane of the side wall of said rib.

In witness whereof I have signed my name to the foregoing specification.

DALLAS M. SMITH.